M. E. CONKLING AND E. E. BUSHELL.
DISPENSING MACHINE.
APPLICATION FILED JUNE 11, 1920.
1,384,687.
Patented July 12, 1921.
5 SHEETS—SHEET 1.
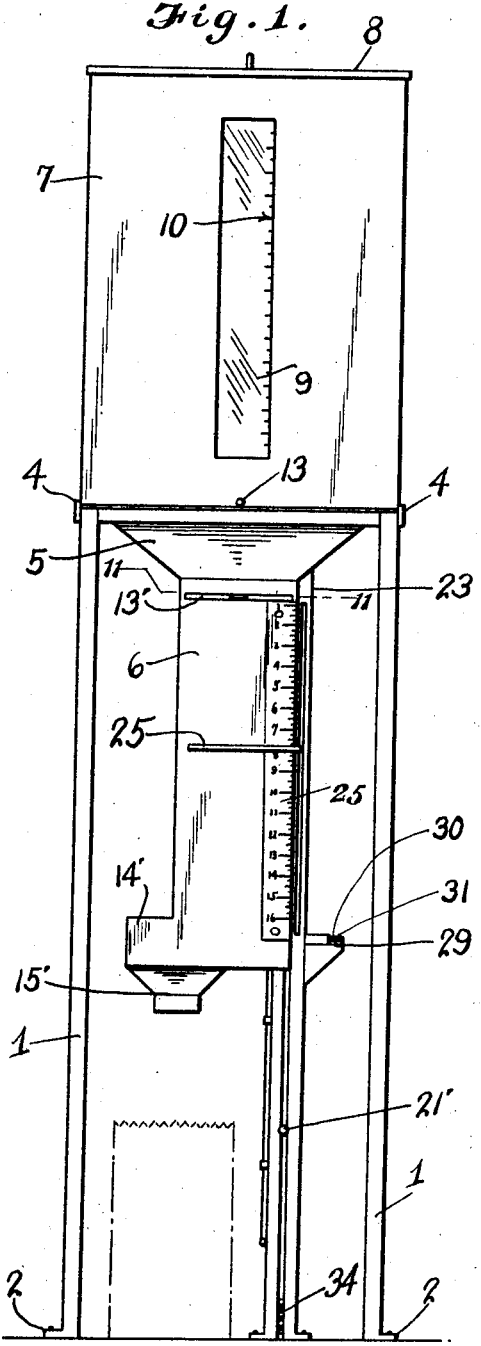
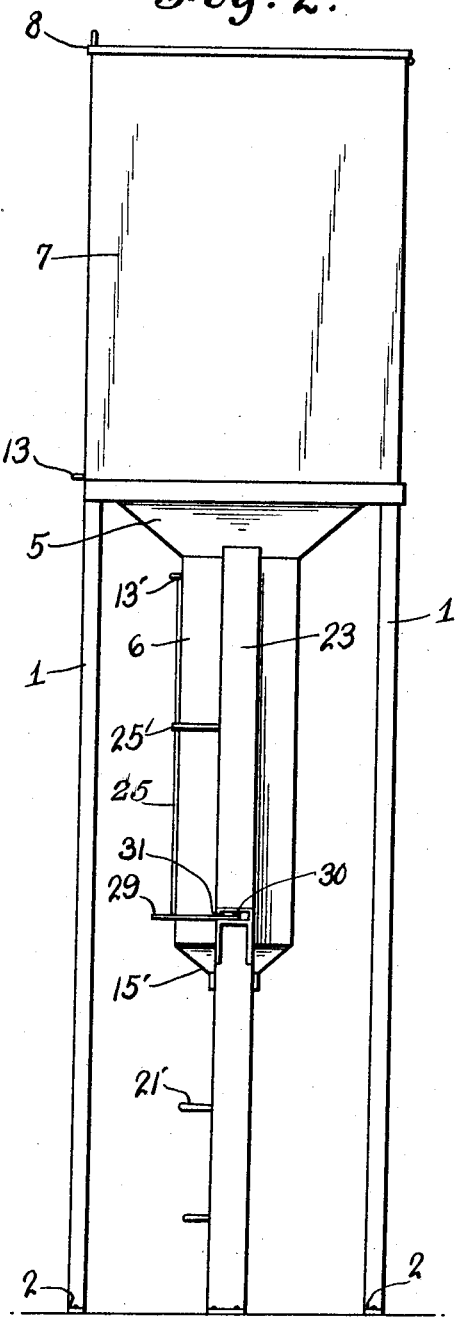
M.E. Conkling &
E.E. Bushell INVENTORS
BY *Victor J. Evans* ATTORNEY
WITNESS:

M. E. CONKLING AND E. E. BUSHELL.
DISPENSING MACHINE.
APPLICATION FILED JUNE 11, 1920.
1,384,687.
Patented July 12, 1921.
5 SHEETS—SHEET 2.
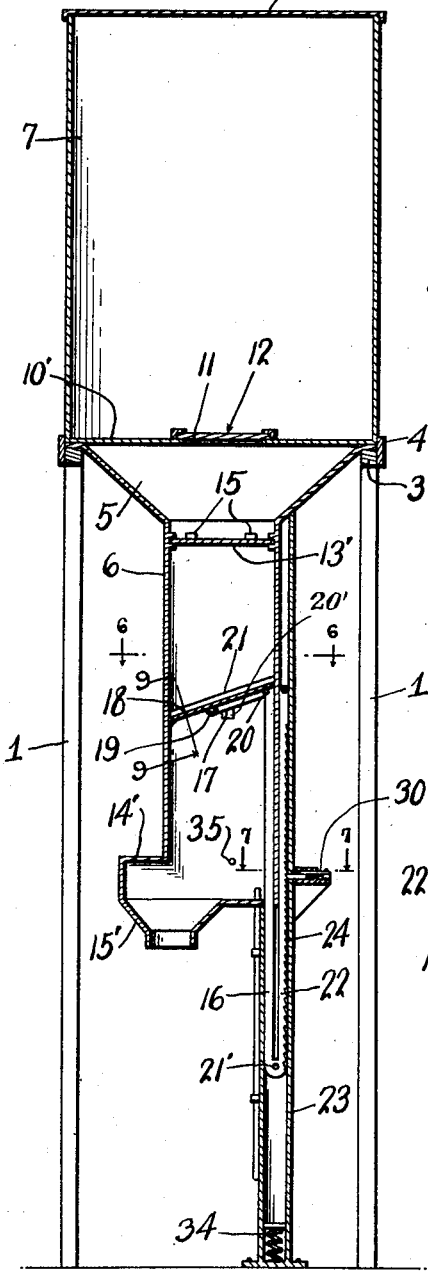
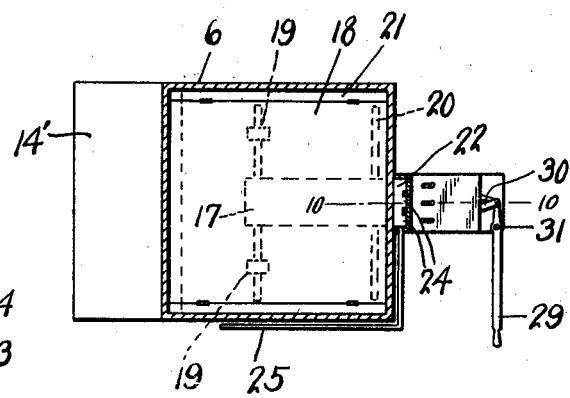
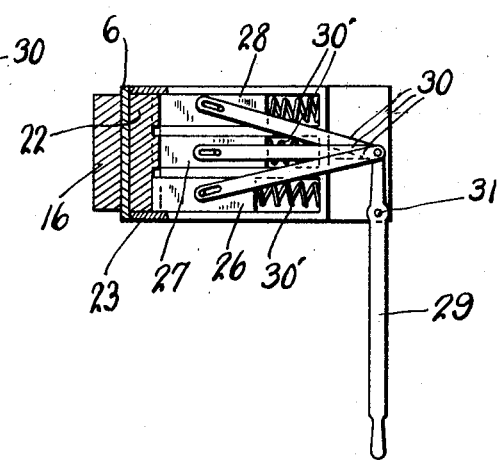
M. E. Conkling &
E. E. Bushell
INVENTORS
BY Victor J. Evans
ATTORNEY

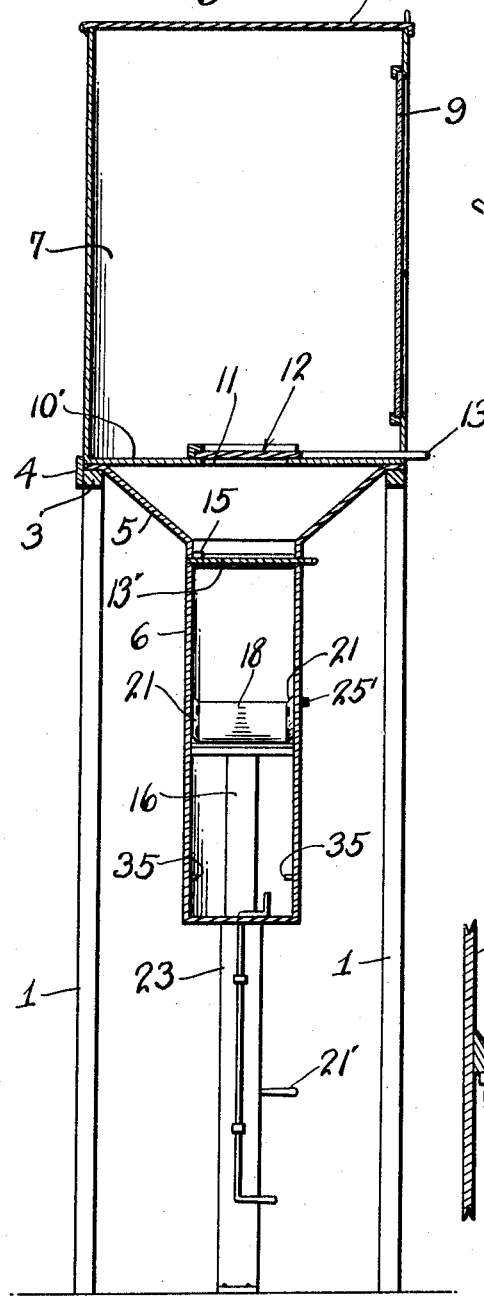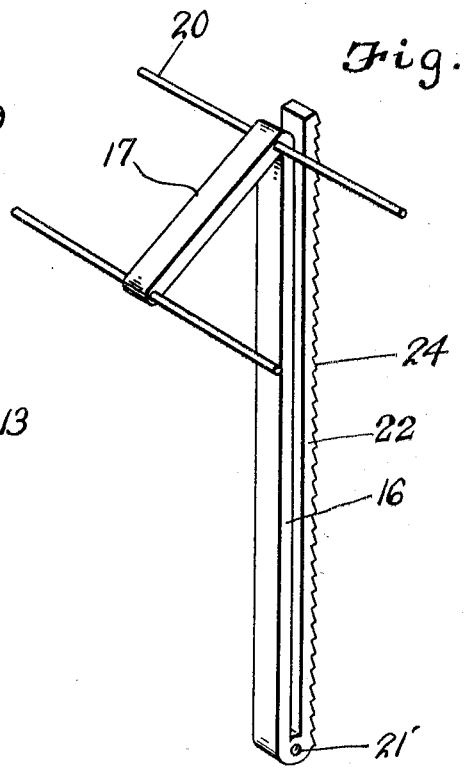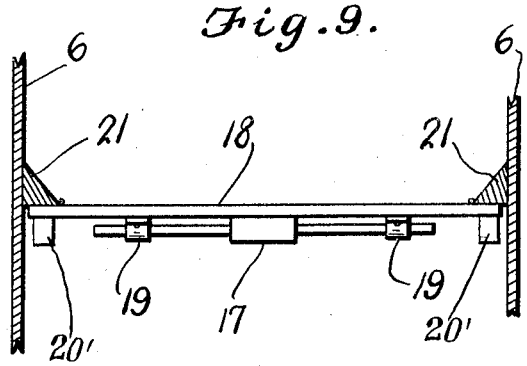

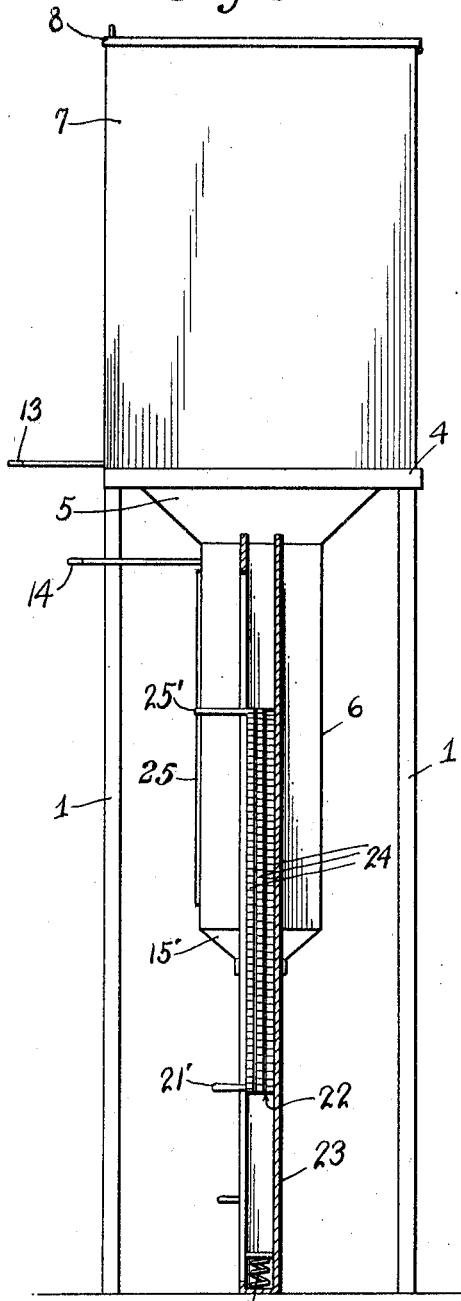
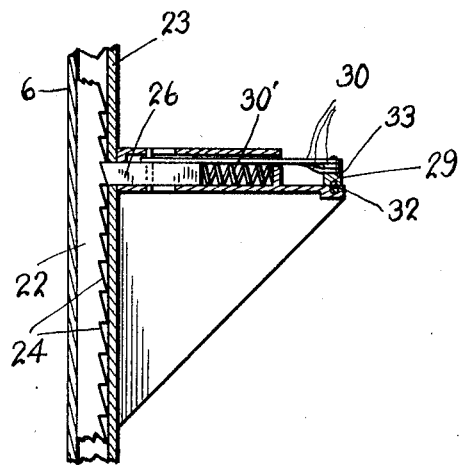
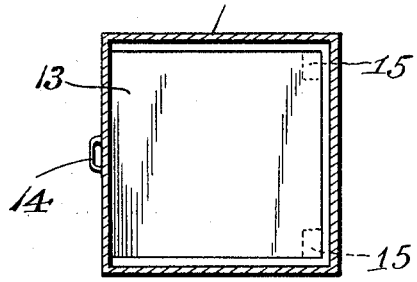

M. E. CONKLING AND E. E. BUSHELL.
DISPENSING MACHINE.
APPLICATION FILED JUNE 11, 1920.

1,384,687. Patented July 12, 1921.
5 SHEETS—SHEET 5.

M. E. Conkling & E. E. Bushell INVENTORS

BY Victor J. Evans ATTORNEY

WITNESS: L. B. James

UNITED STATES PATENT OFFICE.

MARION E. CONKLING AND ERNEST E. BUSHELL, OF LAWTON, OKLAHOMA.

DISPENSING-MACHINE.

1,384,687.  Specification of Letters Patent.  Patented July 12, 1921.

Application filed June 11, 1920. Serial No. 388,255.

*To all whom it may concern:*

Be it known that we, MARION E. CONKLING and ERNEST E. BUSHELL, citizens of the United States, residing at Lawton, in the county of Comanche and State of Oklahoma, have invented new and useful Improvements in Dispensing-Machines, of which the following is a specification.

Our present invention has reference to a dispensing machine adaptable for handling rice, sugar, beans, coffee and other articles or products which will run or flow through a spout.

The primary object is the provision of a sanitary dispensing machine by which an accurately determined amount of product may be dispensed without necessitating the measuring or weighing thereof.

A further object is the provision of a sanitary dispensing machine which will occupy only a small space on a counter, in a cabinet, or the like, and which will effect considerable saving in time and expense in the handling of products.

The foregoing objects, and others which will appear as the nature of the invention is better understood, may be accomplished by a construction, combination and operative arrangement of parts, such as is disclosed by the drawings.

In the drawings:—

Figure 1 is a front elevation of a product dispensing machine, constructed in accordance with this invention.

Fig. 2 is a rear elevation thereof.

Fig. 3 is a central vertical longitudinal sectional view therethrough.

Fig. 4 is a sectional view taken at a right angle to the showing in Fig. 3.

Fig. 5 is a rear elevation with parts in section.

Fig. 6 is a greatly enlarged detail sectional view aproximately on the line 6—6 of Fig. 3.

Fig. 7 is a sectional view on the line 7—7 of Fig. 3.

Fig. 8 is a detail perspective view of the slidable arm.

Fig. 9 is an enlarged sectional view on the line 9—9 of Fig. 3.

Fig. 10 is a sectional view on the line 10—10 of Fig. 6.

Fig. 11 is a sectional view on the line 11—11 of Fig. 1.

Figure 12:
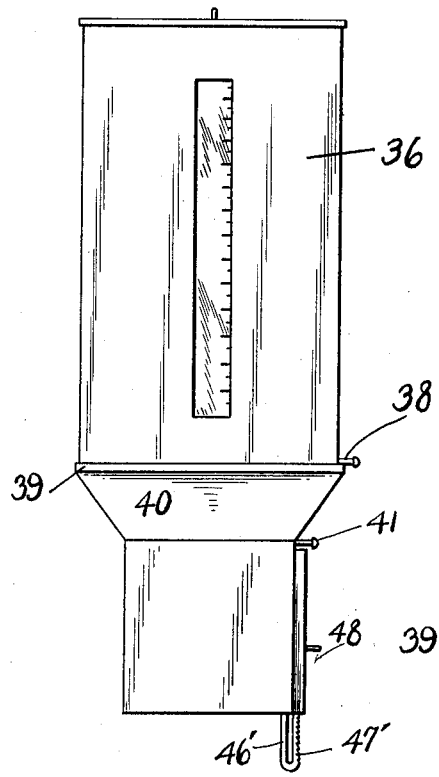
Fig. 12 is an elevation of a modification.

In the construction disclosed in Figs. 1 to 11, our improved dispensing apparatus is devised for use in stores, and may be supported on a counter or the like. The improvement includes an open frame which comprises parallel legs 1 having their lower ends provided with feet 2 that are secured to the counter or other support. The legs 1, at their upper ends are connected by a continuous band 3 whose lower edges are flanged inwardly, as at 4.

The flange 4 provides a support for the funnel-like neck portion 5 of a hopper 6. The funnel end of the hopper is open, and has an upstanding flange which receives therein a bin 7 in which the products are arranged. The bin preferably has an open top normally closed by a hinged and flanged door 8, and if desired this door may be locked in closed position.

The bin 7 has its outer face provided with an opening that is closed by a transparent plate 9, and preferably this plate, or the bin adjacent to the said plate has graduating marks 10 indicating pounds or fractions thereof so that the amount of the product in the bin can be thus determined. The bin has its bottom closed as at 10', the said bottom being centrally provided with an opening 11, and this opening is normally closed by a slidable valve 12, a handle 13 being attached thereto and is arranged at one side of the machine.

In the hopper 6, at the juncture of the straight body portion thereof with its neck 5, there is a slidable valve 13'. The valve is arranged in suitable grooves, and has its handle portion 14 arranged in a convenient position with respect to the operator, and is also provided with means, such as lugs 15 to prevent the entire withdrawal of the valve from the hopper.

On the lower outer end of the hopper 6 there is an extension 14'. This extension has at its lower end, which is in a line with the lower closed end of the hopper proper, an opening surrounded by a funnel shaped member 15' which provides the outlet spout for the hopper.

Slidable through the bottom of the hopper 6, preferably at the rear thereof is an arm 16. This arm 16 has its upper end formed with a downwardly arranged angular neck 17, on which rests a tiltable plate 18. The plate 18 is pivotally connected to the neck 17 of the arm 16, as at 19, and the neck may be provided with a transversely extending rod to more effectively support the plate on the neck. The under face of the plate 18, between its pivot and the rod 20 is provided with lugs 20', for a purpose which will presently be apparant. Connected to the plate 18 are hinged flanges 21, which contact with all of the walls of the hopper, and consequently prevent the product arranged thereon passing between the plate and hopper.

The arm 16 has a handle portion 21' on its lower end, and from the said handle portion the said arm is provided with a vertical extension 22. This extension is received in a guideway 23 on the rear wall of the hopper. The said extension, may be provided by slotting the arm longitudinally from the upper to adjacent the lower end thereof. On its outer edge the extension 23 is provided with three series of transversely arranged notches or teeth 24, each series of which is disposed at different distances away from each other.

On the hopper 6 at one side of the toothed member 22 there is removably arranged an indicating scale 25. The scale is designed to indicate the pounds of product received on the plate 18 from the bin, and as different products vary in bulk with respect to the weight thereof, it is, of course, essential that a number of such scales be employed, one for each product dispensed by the machine. It is, of course, to be understood that only one product will be dipensed at a single time by the machine. The member 22 may be provided with an indicator finger 25' to register with the scale.

On the housing through which the outer member 22 of the slidable arm 16 passes there are supported for slidable movement three dogs 26, 27 and 28. These dogs are designed to engage with respective rack surfaces on the member 22, and all of the dogs are operated by a single lever 29 which has flexible or other connection 30 therewith. The dogs, as stated, are spring influenced, and the springs therefor, are indicated by the numeral 30' respectively. The lever is pivoted, as at 31, to a suitable support preferably provided by a flange or ledge on the housing, and in this support there may be and preferably is a spring influenced detent 32 to engage with a notch 33 in the under face of the lever, whereby the lever may be held when the same has been actuated to bring the dogs out of engagement with the toothed racks.

The housing for the slotted arm may and preferably does extend to the support on which the device is arranged, and in the lower portion of the said housing there is a buffer member 34.

The operation of the device may be briefly described as follows. The gate valve 12 is first operated to permit of a quantity of the product passing on to the gate valve 13'. The valve 12 is then closed and the valve 13' is opened after, of course, the side double arm has been moved to bring the product receiving means 18 to a position to receive the proper and predetermined quantity of product thereon.

The scale 25 begins in a line with the valve 13', and the distance between the said valve and the receiving plate 18, when the latter is adjusted, and held by the dogs permits of the accurate measuring of the amount of products to be dispensed.

The lever 29, after the valve 13 has been closed, is swung to bring the dogs out of engagement with the racks on the outer member of the lever. This, incident to the weight of the products on the plate 18, will cause the plate and arm to move downwardly through the hopper. The lower end of the arm will contact with the buffer 34. The lugs 20' on the plate 18 are designed to engage with contact members 35 on the sides of the hopper, which will swing the plate to cause the products thereon to be delivered through the funnel outlet 15 of the device. There is sufficient room between the funnel and the counter or other support for the arrangement of a bag or sack to receive the products, and as the front of the construction is open, the receptacle for the products may be readily positioned to receive the same.

Figure 13:
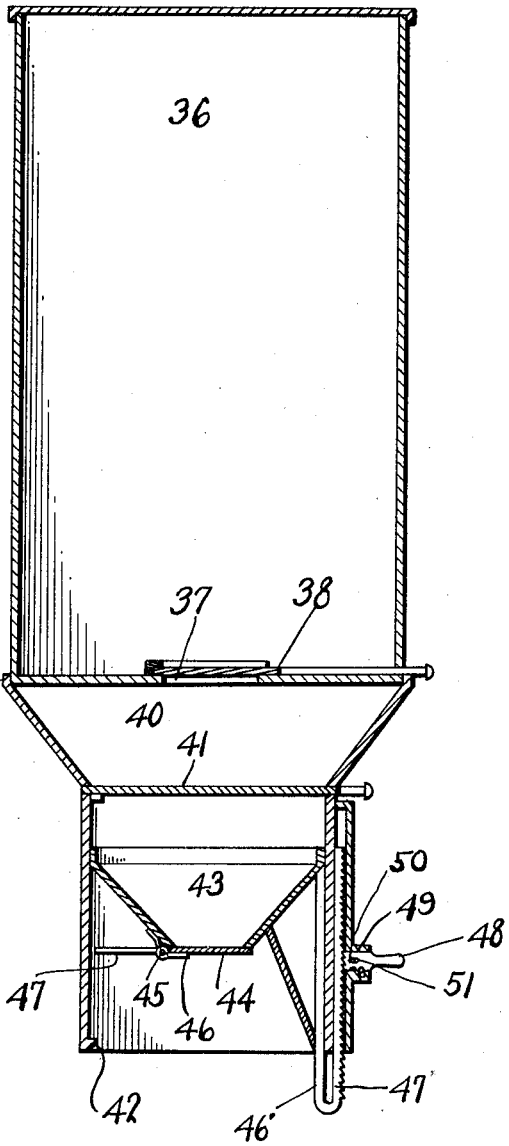
Fig. 13 is an enlarged vertical transverse sectional view therethrough.
Figure 14:
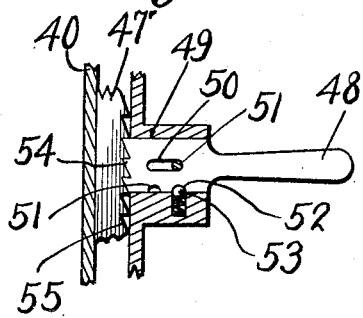
Fig. 14 is an enlarged fragmentary sectional view illustrating the slidable toothed handle engaging the rack surface on the outer portion of the slidable arm.

In Figs. 12 to 14 our dispensing apparatus is preferably of a smaller size than that previously described, and is primarily devised for use in kitchen cabinets or the like.

In the said figures the bin is indicated by the numeral 36 and has its top open, closed by a flanged door, its bottom closed and provided with an opening 37. The opening 37 is normally closed by a slidable valve 38. The bin is supported in a flange 39 on the flared neck of a hopper 40. At the juncture of the neck and the straight body portion of the hopper there is a slidable valve 41, having a handle portion extending through the hopper, but having means, (which is also true with respect to the valve 38,) for preventing the entire withdrawal thereof.

The hopper 40, upon its lower end is provided with an inwardly extending contact member or lug 42. Arranged for slidable movement in the hopper is a product receiving member 43, which is substantially funnel-shaped, and which also engages with the walls of the hopper with sufficient friction as to prevent the passage of products therebetween. The bottom of this member is open, and the said open end is normally closed by a plate 44, which is pivoted to the hopper, as at 45 and which is influenced to bring the same to closed position by a spring 46. One end of the plate 44 is in the path of engagement with the contact member 42.

The product receiving member 43 has secured thereto a depending arm 46' which is rounded upon at its lower end to provide an outer and vertical extension 47'. The extension may be received in a suitable housing that has at its lower portion a buffer, similar to the buffer 34. The handle member 48 is arranged for slidable movement through a flanged opening 49 in the housing for the member 47'. The handle 48 may be spring influenced if desired, the same having a slot 50 therein through which passes a pin in the flanged opening 49 whereby the limit of the movement of the handle in both directions is regulated. The handle member is provided with two spaced depressions 51 and 52 respectively, and the flange 49 is provided with a spring influenced detent 53 designed to engage the depression 51 to hold the handle member in an outward position to engage in the depression 52 to hold the handle member in its inward position. The handle 48 has its inner face toothed as at 54 to engage with teeth or depressions 55 on the outer face of the hopper 40, and opposite these depressions the hopper is provided with a scale to indicate in pounds or fractions thereof the weight of the material received in the member 43 below the slidable valve 41.

Products are permitted to flow through the valve opening in the bin 36 into the hopper 40, and to rest in the closed valve 41 thereof. The valve 38 of the bin may be then closed, providing sufficient products are arranged in the hopper to meet the required amount of such products being received in the member 43. The arm 46 is moved to arrange the receiving member 43 to a position in the hopper to receive therein a determined quantity of product. The valve 41 is then opened and thereafter closed. The closing of the valve sweeps the surplus products to arrange the same in the hopper 40, so that only an accurate predetermined amount of such products is received in the member 43. The handle 48 is now moved outwardly away from the rack, and the receiving member 43 may be permitted to drop by gravity, being influenced by the weight therein. However, the descent of the said member may be regulated by the operator's hand on the handle 48. In its downward movement the end of the hinged closer plate 44 will engage with the contact lug 43, which swings the plate 44 to a position to open the member 43 and to allow the products therefrom to gravitate into a suitable receptacle provided therefor.

It is thought that the foregoing description, when taken in connection with the drawings, will fully set forth the simplicity and advantages of the construction without further detailed description.

The valves 12 and 38, in the bottom of the bin are not necessarily closed except when the bin is being filled. The valves 13 and 41 are designed to level the material in their passage thereover and also to hold the contents of the bins when the said valves are closed.

Having thus described the invention, what we claim, is:—

1. In a product dispensing apparatus, a bin having a slidable valve controlling the outlet thereof, a hopper below and removably associated with the bin and having a valve controlled inlet, a slidable product receiving member in the hopper, means for retaining the member at varying determined positions relative to the valve in the hopper, means for releasing said retaining means to permit the gravitating of the member through the hopper, means for limiting the movement of the member in such direction, and means for discharging the products from the member when the latter is in its lowered position.

2. In a dispensing apparatus for products, a bin having a slidable valve controlling the outlet thereof, a hopper on which the bin rests having a valve controlling the inlet thereof, a support for the hopper, a slidable product receiving member in the hopper, means for retaining the member at varying determined positions in the hopper, releasing means for said retaining means for permitting the gravitating of the member in the hopper, buffer means for the member, and means for discharging products from said member when in its lowered position.

3. In a dispensing apparatus for products, a skeleton support, a hopper on said support, having a slidable valve controlling the passage therefor, a bin resting on the hopper and having a slidable valve controlling the outlet thereof, a vertically movable product receiving member in the hopper, means associated therewith and coengaging with the hopper for retaining the member at varying determined positions in the hopper with respect to the valve of the hopper, releasing means for said retaining means, and means for discharging the products from the hopper when the latter is in its lowered position.

4. In a dispensing apparatus for products, a hopper, a slidable valve controlling the passage therethrough, a bin supported on the hopper, a slidable valve controlling the outlet of the bin, a vertically movable product receiving member in the hopper, means connected therewith, depending therefrom and having a portion arranged against the outer side of the hopper, means carried by the last mentioned portion coengaging with means on the hopper for locking the member for retaining the same in varying determined positions in the hopper with respect to the valve of said hopper, releasing means for said retaining means, and means for discharging the products from the member when the same is in lowered position.

5. In a product dispensing apparatus, a hopper, a slidable valve controlling the passage therethrough, a bin supported on the hopper, a slidable valve controlling the outlet thereof, a product receiving member movable vertically in the hopper, an arm connected thereto and depending therefrom, said arm having an extension arranged adjacent one of the outer walls of the hopper, a rack bar on the hopper next to said extension, a pawl carried by the extension for engaging with the rack bar, means for retaining the pawl in rack engagement, means for retaining the pawl out of such engagement to permit of the gravitating of the member in the hopper, buffer means for engaging with the arm when the said member is in lowered position, and means for discharging the products from said member when in said lowered position.

6. In a product dispensing apparatus, a hopper having toothed racks on one of the outer faces thereof, a removable scale adjacent said racks, said hopper having a funnel shaped upper end, a slidable valve for controlling the passage of the hopper, a bin supported on the hopper, a slidable valve controlling the outlet thereof, a vertically movable product receiving member in the hopper below the valve, an arm connected thereto and depending therefrom, said arm having an outer vertical extension, a housing on the hopper therefor, pawls carried by the extension for engagement with the rack bars, means for retaining the pawls in rack engagement, means for latching the pawls out of such engagement to permit of the gravitating of the product receiving member through the hopper, buffer means for contacting with the outer end of the arm when the said member is in lowered position, and means for discharging the products therefrom when the said member is in said lowered position.

7. In a product dispensing apparatus, a bin having a transparent graduated panel, a slidable valve controlling the outlet of the bin, a hopper having a funnel shaped end in which the end of the bin is received, a valve controlling the passage of the hopper, product receiving means slidable in the hopper and including a tiltable bottom, means for retaining the bottom in closed position, means connected with said product receiving means and engaging with the hopper for detaining the first mentioned means at determined positions with respect to the valve of the hopper, releasing means for permitting the gravitating of the product receiving means, through the hopper, means for limiting the downward movement of said product receiving means, and means in the hopper for contacting with the pivoted plate to swing the same to an open position when the parts are in their last mentioned position.

In testimony whereof we affix our signatures.

MARION E. CONKLING.
ERNEST E. BUSHELL.